(12) United States Patent
Martin et al.

(10) Patent No.: US 6,384,773 B1
(45) Date of Patent: May 7, 2002

(54) ADAPTIVE FRAGMENTATION AND FREQUENCY TRANSLATION OF CONTINUOUS SPECTRUM WAVEFORM TO MAKE USE OF DISCONTINUOUS UNOCCUPIED SEGMENTS OF COMMUNICATION BANDWIDTH

(75) Inventors: Gayle Patrick Martin, Merritt Island; John Shipley, Sebastian, both of FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/737,707

(22) Filed: Dec. 15, 2000

(51) Int. Cl.[7] .................. G01S 13/00; H04B 15/00; H04L 27/30
(52) U.S. Cl. ............... 342/202; 342/21; 342/82; 342/159; 342/175; 455/63; 375/130; 375/139; 375/140; 375/146
(58) Field of Search ................. 342/192–197, 342/200–204, 82–88, 159–164, 21; 375/130–153; 455/63, 64, 65; 370/342

(56) References Cited

U.S. PATENT DOCUMENTS

| 4,443,799 A | * | 4/1984 | Rubin ................... 342/201 |
| 5,359,624 A | * | 10/1994 | Lee et al. ............... 370/342 |
| 6,023,488 A | * | 2/2000 | White .................... 375/146 |

* cited by examiner

Primary Examiner—Bernarr E. Gregory
(74) Attorney, Agent, or Firm—Allen, Dyer, Doppelt, Milbrath & Gilchrist, P.A.

(57) ABSTRACT

Identity transform filters, such as sin(x)/x filters, are used to coherently fragment the frequency continuum of a wideband waveform, such as an ultra wideband radar signal, into a plurality of spectral segments that are capable of fitting into unoccupied spectral regions of a partially occupied electromagnetic spectrum. The wideband waveform has a bandwidth that falls within the partially occupied portion of the electromagnetic spectrum, and exceeds that of any unoccupied spectral region. The total useable bandwidth of the unoccupied regions is at least equal to that of the wideband waveform.

14 Claims, 6 Drawing Sheets

ADAPTIVE FRAGMENTATION AND FREQUENCY TRANSLATION OF CONTINUOUS SPECTRUM WAVEFORM TO MAKE USE OF DISCONTINUOUS UNOCCUPIED SEGMENTS OF COMMUNICATION BANDWIDTH

FIELD OF THE INVENTION

The present invention relates in general to communication systems, and is particularly directed to a mechanism for enabling a continuous wideband waveform, such as an ultrawideband (UWB) radar signal, to be transmitted without mutual interference with other communication signals that occupy portions of a spectrum containing discontinuous unoccupied spectral regions whose total available bandwidth is at least equal to that of the continuous wideband waveform.

BACKGROUND OF THE INVENTION

With continuing advances in communication systems, components, modulation techniques and waveforms therefor, coupled with the ongoing demand for more and more bandwidth, there are occasionally requirements to transmit a waveform whose bandwidth is considerably wider than any available contiguous unoccupied portion of the available electromagnetic spectrum. As a non-limiting example, it may be desired to transmit a radar waveform, such as a very wideband (e.g., 500 MHz) chirp signal, using relatively long wavelengths that may be employed by a variety of conventional communication systems, such as broadcast FM and television transmitters, UHF and VHF, cellular radios, and the like.

These longer wavelengths provide such a radar signal with foliage and cultural feature penetration properties not possessed by radar signals having very short wavelengths. Still, for a reasonably acceptable spatial resolution of the imaged target, the bandwidth of the radar signal must be very wide, as resolution can be effectively defined in terms of half the inverse of the signal bandwidth. For example, a 500 MHz wide radar signal can provide a spatial resolution on the order of one foot. Unfortunately, such a bandwidth is considerably wider than any continuous portion of the longer wavelength regions of the regulated electromagnetic spectrum. Namely, such a radar signal won't 'fit' in the spectral region of interest.

This may be understood by reference to FIG. 1, which is a spectral diagram showing the typical 'punctuated' occupancy of a 1.0 GHz wide portion of the communication bandwidth (from 0 Hz to 1.0 GHz) by a variety of communication systems users in the vicinity of Washington, D.C. A cursory examination of FIG. 1 reveals that there is simply no unoccupied or potentially available 'gap' between adjacent users that provides room for a relatively wide bandwidth (e.g., 500 MHz) waveform. Indeed, in FIG. 1, the widest gap appears to be on the order of only of 70 MHz.

SUMMARY OF THE INVENTION

In accordance with the present invention, this problem is successfully addressed by employing identity transform filters (such as sin(x)/x filters) to coherently fragment or subdivide the frequency continuum of a wideband waveform (such as an ultra wideband radar signal) into a plurality of (variously narrow and wide) spectral segments or sub-band components, that are capable of fitting into unoccupied spectral regions of a partially occupied electromagnetic spectrum, the total useable bandwidth of the unoccupied regions being at least equal to that of the wideband waveform.

A sin(x)/x filter is a preferred identity transform filter due to its simplicity and power. Even though an infinite bank of such filters would be mathematically required to produce an 'exact' identity transform, in practice only a relatively small number of filters is required, especially where the signal (such as a chirp) is inherently band-limited. A sin(x)/x filter bank is closely related to the Fourier transform, differing primarily in integration limits. Attractive properties of the sin(x)/x filter include the fact that it is a simple moving average and that an inverse transformation is obtained by summing the outputs of the filter bank. Additionally, the orthogonality of all of the filters in a filter bank allows independent shaping of the composite filter bank response at N points, where N is the number of sin(x)/x filters.

The fragmented portions of the signal are then independently up- or down-converted to transmission carrier frequencies that will selectively place the translated fragments within such unoccupied portions of the spectrum. At the receiver, the process is reversed, and correction is made for any relative motion (as by using the Lorentz transformation (or an acceptable approximation)). In this manner, the original spectrum can be coherently reconstructed and subsequently processed in a conventional manner.

As will be described, the present invention provides a number of significant features, including the ability of a UWB radar to transparently employ almost any traditional desirable radar signal (such as a chirp) as the basic waveform. The coherent fragmentation mechanism of the present invention allows this basic waveform to be partitioned into available spectrum locations, irrespective of their location in frequency, individual bandwidths, or any intervening band gaps. Dynamic re-allocation of individual transmission frequencies and bandwidths may also be employed, as long as the total spectrum bandwidth available equals or exceeds that of the base UWB signal. At the receiver, only relatively modest processing is required to coherently reconstruct the basic radar waveform from the fragmented spectrum, thus allowing the use of traditional radar waveform processing.

The invention permits use of almost any traditional radar waveform, including single-pulse waveforms. UWB bandwidths on the order of from 60 to 500 MHz can readily be accommodated, as well as operating frequencies from 20 to 600 MHz. Arbitrary PRF and duty cycle are automatically included through a user-selected base waveform (such as chirp). The fraction of bandwidth occupied can range from less than 10% to 100%. There are no fundamental restrictions on spectrum segment widths or spacing. The technique described herein allows daily, hourly, or millisecond scale changes in spectrum usage and base waveform choice.

DETAILED DESCRIPTION

Figure 1:
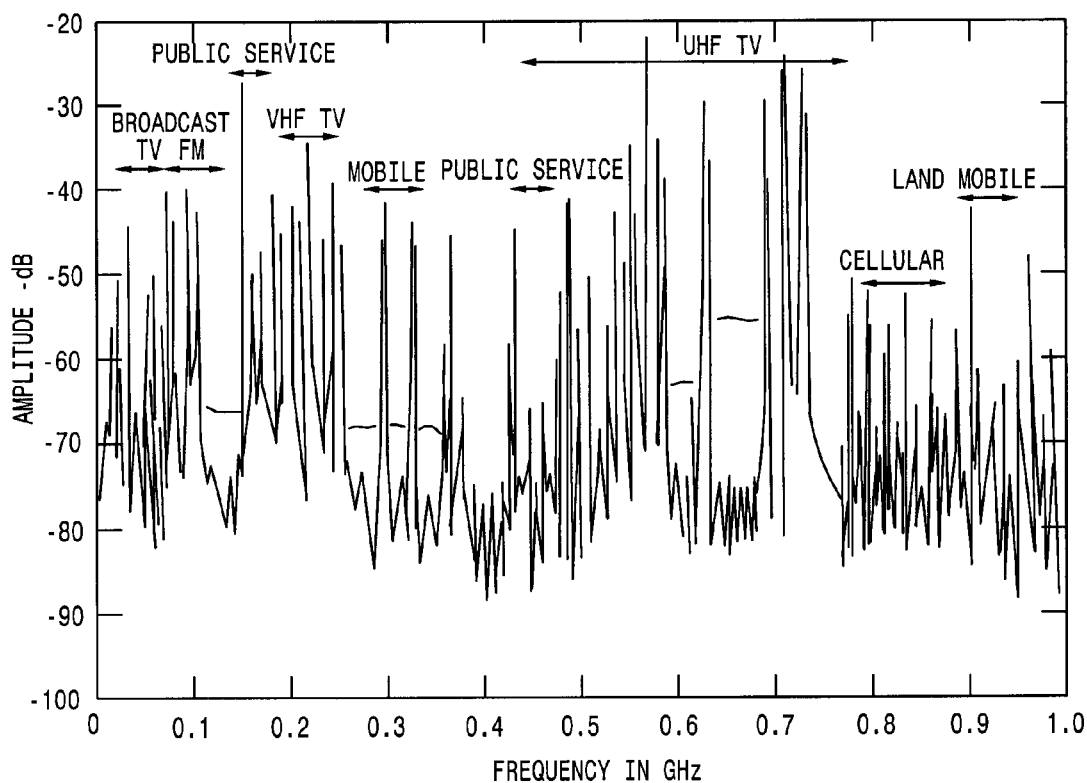
FIG. 1 is a spectral diagram showing the typical 'punctuated' occupancy of a 1.0 GHz wide portion of the communication bandwidth by communication systems users in the vicinity of Washington, D.C.

Before describing in detail the new and improved spectrum fragmentation mechanism of the present invention, it should be observed that the invention resides primarily in prescribed arrangements of conventional communication circuits and associated signal processing components and attendant supervisory control circuitry therefor, that controls the operations of such circuits and components. In a practical implementation that facilitates their incorporation into existing communication equipment, such as but not limited to a wideband radar system, these arrangements may be readily implemented as field programmable gate array (FPGA)-implementation, application specific integrated circuit (ASIC) chip sets, programmable digital signal processors, or general purpose processors.

Consequently, the configuration of such arrangements of circuits and components and the manner in which they are interfaced with other communication equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the invention in a convenient functional grouping, whereby the present invention may be more readily understood.

As described briefly above, a fundamental component employed in the fragmentation mechanism of the present invention is an "identity transform" filter. Such a filter may be implemented from a variety of existing types, including sin(x)/x, the Fourier transform, certain diplexers, crossover networks common in audio loudspeaker systems, and a number of wavelet transform generated filter banks. For purposes of providing a non-limiting but preferred implementation, the invention will be described in terms of using the sin(x)/x function.

Figure 2:
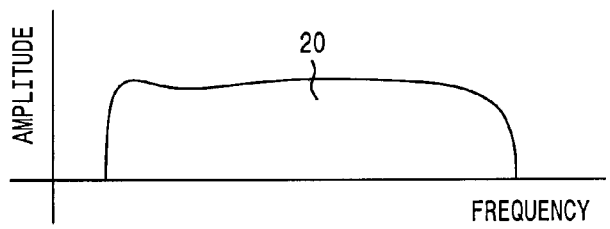
FIG. 2 is a spectral diagram of an arbitrary chirp waveform.
Figure 3:
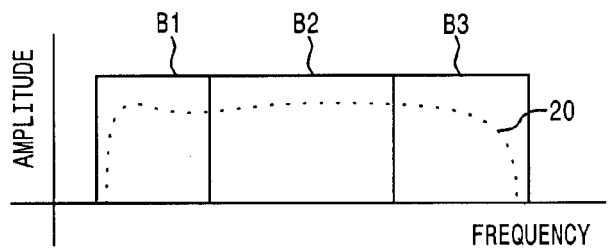
FIG. 3 is a spectral diagram associated with the application of the chirp waveform of FIG. 2 to three ideal rectangular filters.
Figure 4:
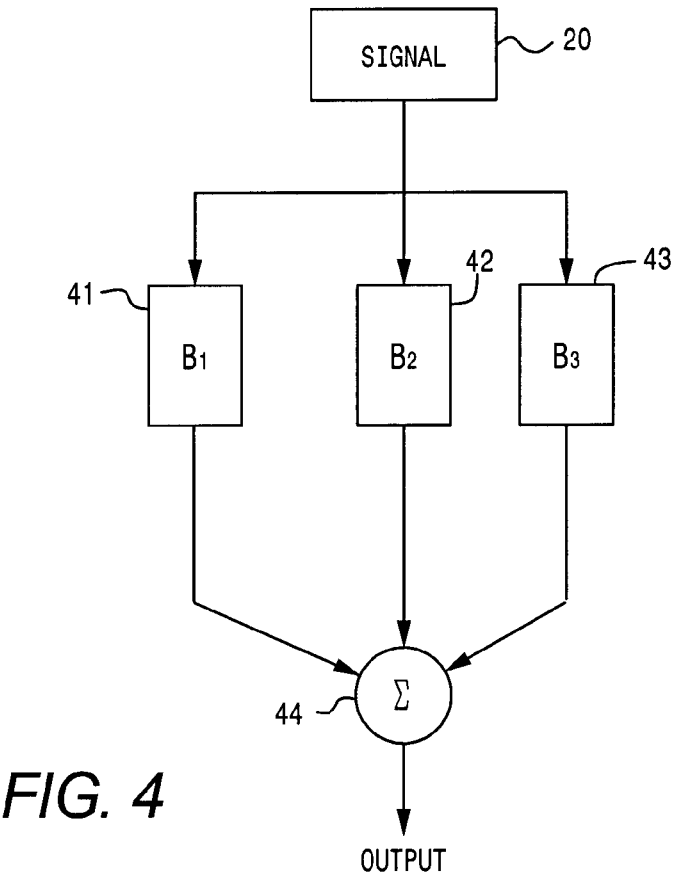
FIG. 4 is a filter processing block diagram for the three ideal filter application of FIG. 3.

For purposes of facilitating an understanding of the inventive fragmentation scheme, it is initially useful to consider the application of a mathematically notational entity known as the 'ideal rectangular' bandpass filter to selectively filter or sub-divide an arbitrary waveform, such as a chirp signal, the spectrum of which is illustrated at 20 in FIG. 2. As further shown in the spectral diagram of FIG. 3, and the filter processing block diagram of FIG. 4, this signal may be spectrally fragmented or sub-divided into an arbitrary set of three contiguous sub-bands B1, B2 and B3 by means with three appropriately specified 'ideal rectangular' filters 41, 42 and 43. Simple addition or summing of the filter outputs in a summation unit 44 exactly restores the original waveform. It may be noted that an arbitrary frequency conversion of each of the sub-bands will not change the identity transform property, as long as an inverse frequency conversion is performed prior to summing.

Figure 5:
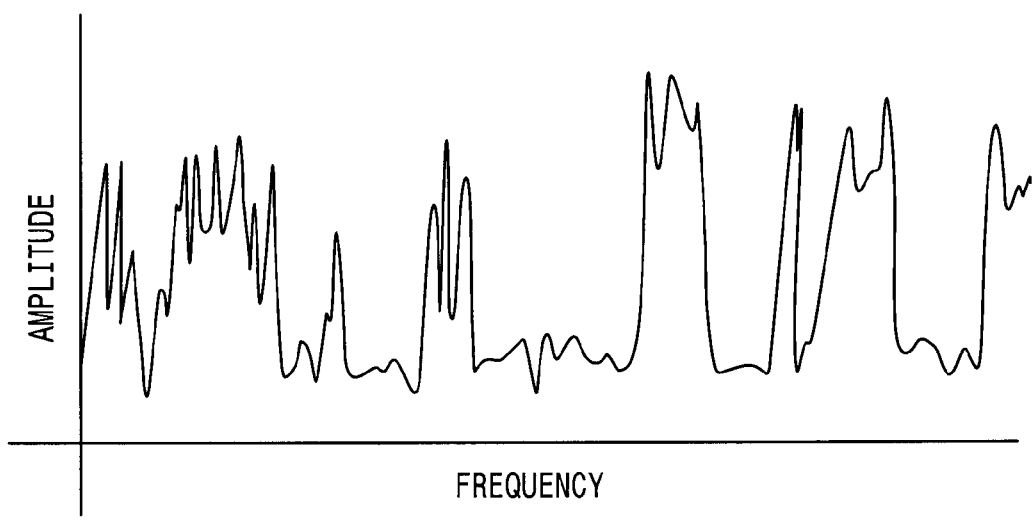
FIG. 5 is a spectral diagram showing an example of a user-punctuated spectrum containing various unoccupied band gaps of varying bandwidths, whose total bandwidth is at least sufficient to accommodate the bandwidth of the waveform of FIG. 2.

FIG. 5 is a spectral diagram similar to FIG. 1, showing an example of a user-punctuated spectrum containing various unoccupied band gaps BG of varying bandwidths, whose total bandwidth is at least sufficient to accommodate the bandwidth of the waveform of FIG. 2. As a non-limiting example, the spectral content of a partially occupied bandwidth of interest may be readily measured using a conventional scanning subsystem, the output of which is selectively classified and stored in an associated frequency bin data base of the wideband signaling system (e.g. radar system) in which the present is employed.

Figure 6:
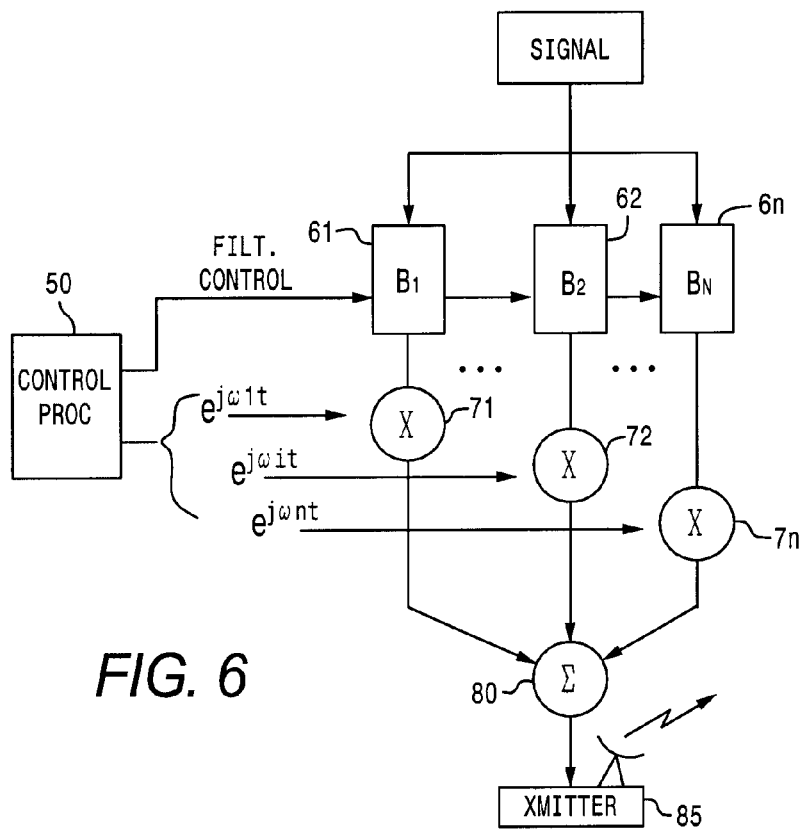
FIG. 6 shows a spectrum fragmentation operator containing a plurality of rectangular bandpass filters having respective bandwidths associated with comparably sized band gaps of the spectral diagram of FIG. 5.
Figure 7:
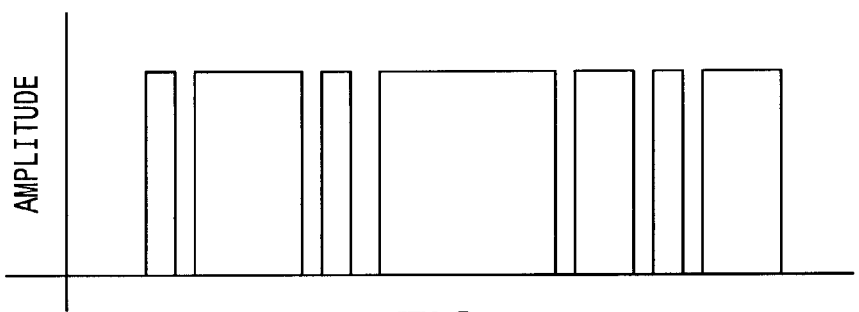
FIG. 7 is a spectrum fragmentation diagram associated with the spectrum fragmentation operator of FIG. 6.

For each bandgap Bi there is an associated center frequency $\omega i$. FIG. 6 shows a spectrum fragmentation operator containing a plurality of rectangular bandpass filters 61, 62, . . . 6n, which may be digital implemented so as to be selectively programmable by an associated control processor 50, based upon the measured spectral content of the partially occupied bandwidth of interest, as described above. These filters have respective bandwidths B1, B2, . . . , Bn, associated with comparably sized ones of the band gaps BG of the spectral diagram of FIG. 5 and, as shown in the spectrum fragmentation diagram of FIG. 7, have a total bandwidth corresponding to that of the wideband signal of FIG. 2.

Figure 8:
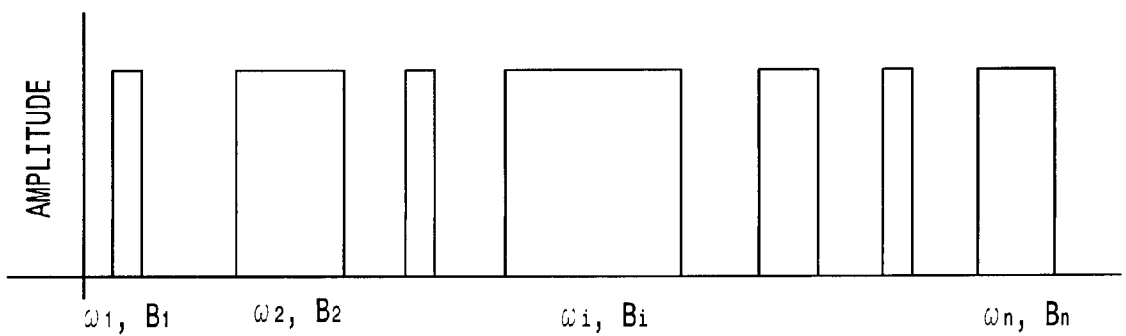
FIG. 8 is a spectral diagram showing frequency translation of the filter outputs of FIG. 6 to fit within available RF frequency gaps of the spectral diagram of FIG. 5.

Applying the waveform of FIG. 2 to the fragmentation filtering scheme of FIG. 6 separates the wideband waveform into 'n' independent spectral channels, where each spectral channel effectively fits within or ideally just matches the bandwidth space of a respective one of the unoccupied bandgaps BG of the spectral diagram of FIG. 5. The outputs of the filters 61, 62, . . . , 6n are then coupled to respective frequency converters 71, 72, 7n, that are operative, under processor control, to independently translate the filtered signals, so that, as shown in the spectral diagram of FIG. 8, they may fit within unoccupied RF frequency gaps centered at frequencies $\omega 1, \omega 2, \omega 3, \ldots \omega n$. The frequency-translated signals are then summed in summation unit 80 and applied to a transmitter 85 for transmission. In this way, almost any UWB radar signal may have its relatively compact spectrum mapped to an 'actually available' discontinuous RF spectrum.

Figure 9:
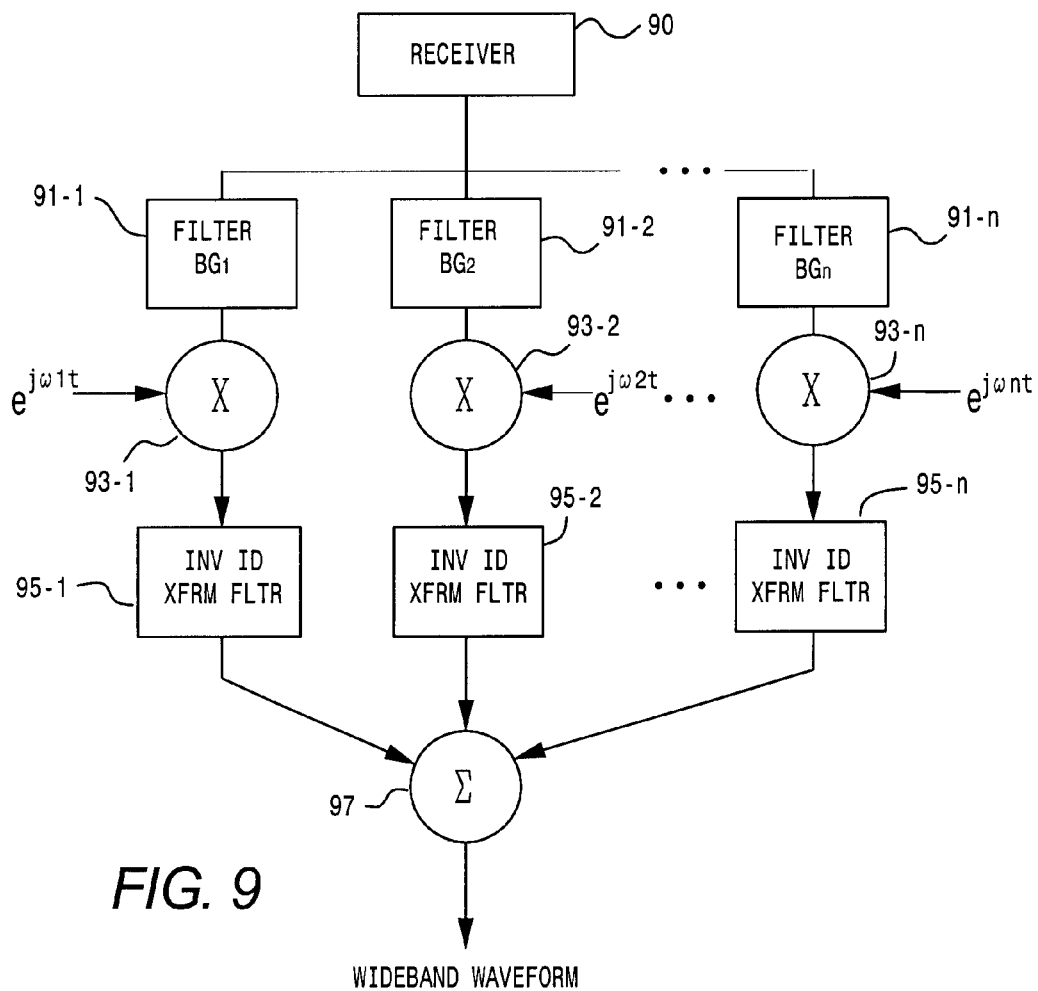
FIG. 9 is a receiver diagram for recovering the wideband waveform produced by the spectrum fragmentation operator of FIG. 6.

At the receive end, shown in the block diagram of FIG. 9, the output of a receiver 90 is coupled to a set of selectively tunable bandpass filters 91-1, 91-2, 91-n, whose center frequencies correspond to the frequencies $\omega 1, \omega 2, \omega 3, \ldots \omega n$, and the bandpass widths B1, B2, . . . Bn of which correspond to those of the filters 61, 62, 6n as defined by the system control processor. The outputs of the filters 91 are frequency-translated by mixers 93-1, 93-2, 93-n and then applied to respective inverse identity transform filters 95-1, 95-2, ..., 95-n to recover the original spectral components of the wideband waveform. These spectral components are then combined in summing unit 97, the output of which is the original wideband waveform.

While the foregoing technique applies to a static, linear and non-dispersive transmission path, in a practical radar (e.g., synthetic aperture radar (SAR) application), the signal propagation path can be expected to be non-static, so that corrections are necessary in order for the fragmented spectrum to be re-combined successfully in the receiver. Qualitatively, Doppler shifts at the discontinuous sub-bands are not in accord with the contiguous signal's Doppler shift. This effect can be corrected exactly, by incorporating the Lorentz transform to each sub-band receiver channel for the respective inverse filters. It may be noted that the Lorentz transform, even at non-relativistic velocity, exactly describes the Doppler effect in terms of time being different in the moving frame of reference. This is significant since the information contained in the Doppler shifted data is fundamental to image formation.

Mathematically, the process may be described as follows.

After filtering by the set of identity transform filters the signal $S(\omega,)$ may be defined as:

$$S(\omega, t) = \sum_n f_i(\omega, t) \quad (1)$$

where $f_i$ represents the respective outputs of the filters.

After frequency conversion of each sub-band to its RF frequency available for transmission, the signal becomes:

$$S_{TX}(\omega, t) = \sum_n f_i(\omega, t)e^{j\omega_i t} \quad (2)$$

Due to relative motion, the received signal (reflected radar return) may be affected differently for each pixel in a digitally imaged target scene. A signal received from a given pixel at time t may be expressed using the Lorentz transform.

Essentially, one may simply substitute $t \Rightarrow \gamma_i(t+\tau_i)$, where $\gamma=(1+v/c)/(1-v^2/c^2)^{1/2}$ and $\tau$ is time delay, both relative to the pixel of interest (two-way parameters assumed). From the jth pixel, the received signal is:

$$S_{RXj}(\omega, t) = \sum_n f_i(\omega, Y_i(t+\tau_i))e^{j\omega_i Y_i(t+\tau_i)} \quad (3)$$

Restoration of the transmitted fragmented spectrum to its original form is obtained by inverse frequency conversion of each of the sub-bands independently. This operation yields:

$$S_{RXj}(\omega, t) = \sum_n f_i(\omega, Y_i(t+\tau_i))e^{j\omega_i Y_i(t+\tau_i)} e^{-j\omega_{ic} t+\varphi_{ic}} \quad (4)$$

If the restored waveform is to be equivalent to that obtained by directly transmitting the unmodified basic radar waveform, the exponential terms must cancel. Specifically, it is necessary that:

$$\omega'_i \gamma_i(t+\tau_i) = \omega_{ic} t + \omega_{ic} \quad (5)$$

The necessary frequency correction is seen to be simply the nominal offset of a sub-band plus a Doppler shift:

$$\omega_{ic} = \omega_i \gamma_i \quad (6)$$

If no relative motion is present, then $\gamma=1$, indicating that frequency conversion back to the base value will restore the original waveform. A similar expression is obtained for phase correction as:

$$\omega_{ic} = \omega_i \gamma_i \tau_i \quad (7)$$

It should be noted that the above corrections specifically relate to the sub-band offset frequency conversions that are necessary to place the sub-bands at the arbitrary frequencies available for transmission. The spectral terms within the actual sub-band waveform are already correct.

After independent frequency and phase correction for each of the sub-bands, the received signal for the jth pixel is exactly in the form obtained, when the basic radar waveform is directly transmitted through identity transform filters, as:

$$S_{RXj}(\omega, t) = \sum_n f_i(\omega, Y_i(t+\tau_i)) \quad (8)$$

From a practical standpoint, the operations discussed above may be readily incorporated into digitally executed image processing algorithms at the pixel level, where similar operations are being performed. Depending upon the specifics of band fragmentation, scene extent, and relative motion, adequate approximate correction can alternatively be obtained at the composite received signal level, where an 'average' sub-band frequency and phase correction is applied to every pixel instead of a scene-specific one. As a non-limiting example, for a 300 m/sec aircraft SAR image, a 10 km scene extent would generate about 50 Hz of Doppler at a 100 km broadside range. For 1.0 m azimuth resolution, 1000 Doppler azimuth bins are required for the image. The number of sub-band shifts needed for satisfactory data recovery will depend on the spectrum fragmentation. For reasonable fragmentation this number may fall in the range of 20 to 100. A LEO space SAR at 2000-Km range yields a similar result.

As described briefly above, due to its simplicity and power, a $\sin(x)/x$ filter is a preferred identity transform filter. Although an infinite bank of such filters would be mathematically required to produce an 'exact' identity transform, in a practical, real world application, only a few filters are required, especially where the signal (such as a chirp) is inherently band-limited.

Figure 10:
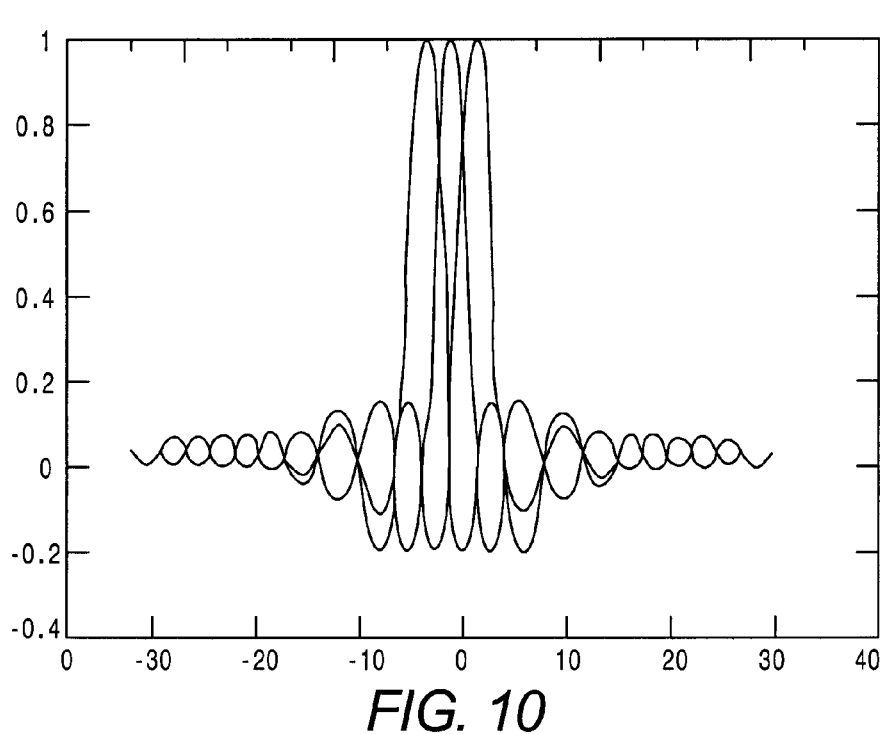
FIG. 10 illustrates the stacking of individual filters to create a bank of identity transform filters.
Figure 11:
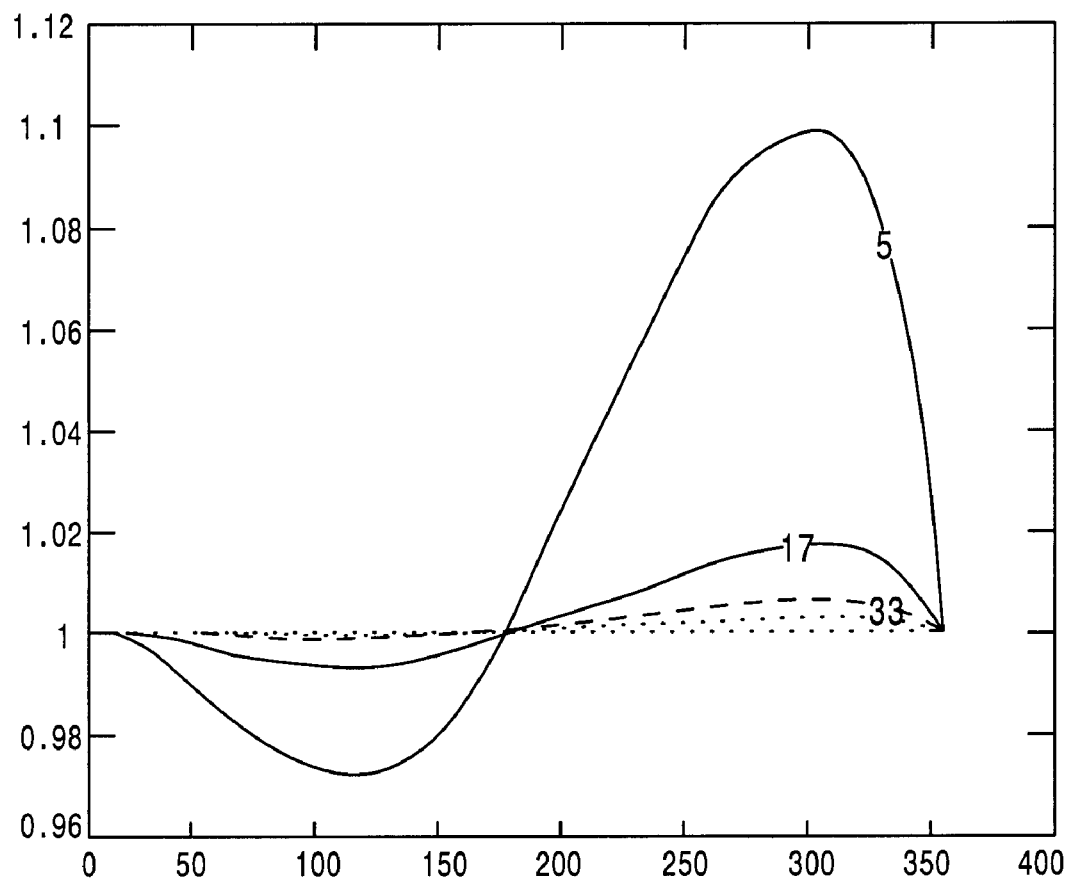
FIG. 11 shows the effect of increasing the number of filters to reduce transform error, showing indirectly that band center can be effectively reproduced by employing only a relatively small number of filters in the bank.

FIG. 10 illustrates the stacking of individual filters to create a bank of identity transform filters, while FIG. 11 shows the effect of increasing the number of filters to reduce transform error, showing indirectly that band center can be effectively reproduced by employing only a relatively small number of filters in the bank. The greatest error, of course, occurs at band edges where the filter bank is terminated.

A $\sin(x)/x$ filter bank is closely related to the Fourier transform, differing primarily in integration limits (0 to T for the Fourier Transform and from t to (t+T) for the $\sin(x)/x$ transform). Very appealing properties of the $\sin(x)/x$ filter include the fact that it is basically a simple moving average and that an inverse transformation is obtained easily by merely summing the outputs of the filter bank. Additionally, the orthogonality of all of the filters in the bank permits independent shaping of the composite filter bank response at N points, where N is the number of $\sin(x)/x$ filters. Baseband versions of a $\sin(x)/x$ filter bank require frequency conversion to DC and back, with an advantage of identical filter-to-filter performance. However, completely passive alternative IF band pass filters are usually preferred even though exactly identical filters may not be obtained.

Filters of this type have been employed for more than a decade in communication systems, ranging from RF to IF to baseband to digital. Signal bandwidths have varied from KHz to multi-GHz, and the number of filters in a complete bank has ranged up to the hundreds. A principal use is in adaptive dispersion compensation, where frequency domain correction is an attractive alternative to the more common time domain transversal filters. In a typical system, a dispersed signal (or signals) of interest are fed to a $\sin(x)/x$ filter bank. Outputs from each filter are then independently amplitude and phase weighted (usually adaptively) then re-combined by simple addition, thus directly compensating the dispersed signal by 'flattening' its spectrum. Independent adjustment of the spectrum is obtained at N points, where N is the number of $\sin(x)/x$ filters. This independent adjustment is directly due to properties of the $\sin(x)/x$ function, which has nulls at all other filter peaks.

Figure 12:
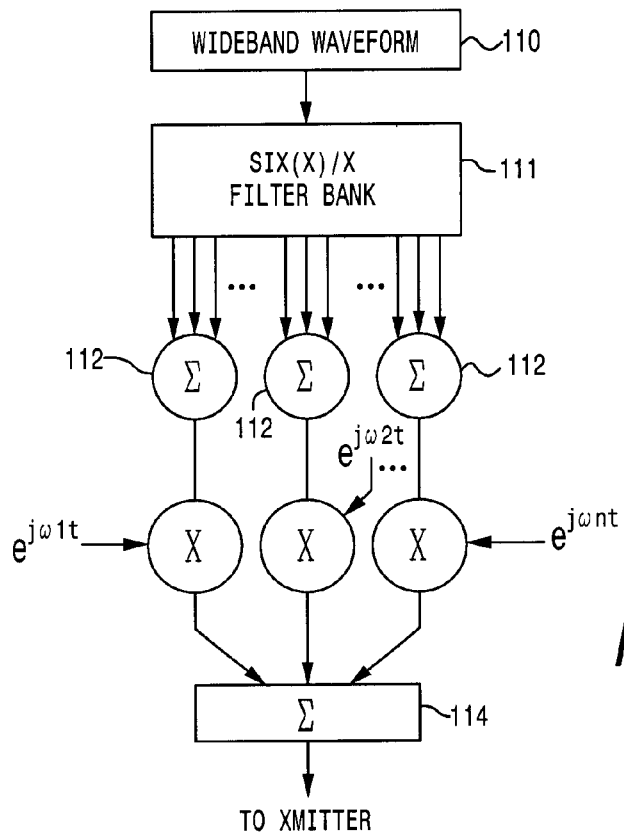
FIG. 12 is a functional flow diagram for implementing a sin(x)/x filter bank.
Figure 13:
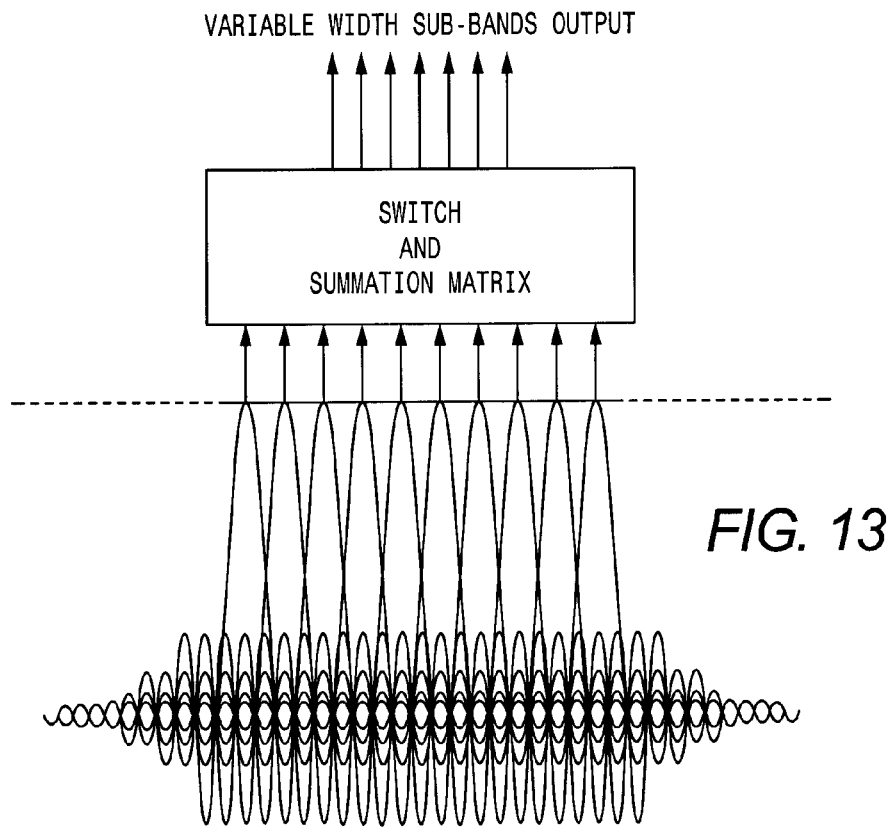
FIG. 13 is a reduced complexity spectral-summation grouping process diagram associated with the functional flow diagram of FIG. 12.

A $\sin(x)/x$ filter bank may be readily configured as shown in the functional flow diagram of FIG. 12 and the reduced complexity spectral-summation grouping process diagram of FIG. 13, to fragment a given UWB in accordance with the mechanism described above with reference to FIGS. 5–8. The signal waveform 110 is applied to a uniform filter bank 111, where the $\sin(x)/x$ filter width is not greater than the narrowest bandwidth in the available spectrum. (To ensure meeting specifications on allowable UWB radar dispersion, it may be necessary to employ even narrower filter widths). Next, to the extent possible, outputs from a respective contiguous group or set of filters within the bank 111, whose total group bandwidth fits within a 'next available' spectrum slot or bandgap, are combined in a respective combiner or summing unit 112, to provide a filtered waveform signal to be transmitted in that spectral slot. A respective frequency multiplier 113 places this filtered signal at the required location in the available spectrum. The frequency-translated fragments of the wideband waveform are then summed in summing unit 114 and coupled to the transmitter. It should be noted that band-edge effects are not important in this "internal" grouping of $\sin(x)/x$ filters, since reconstruction of the basic waveform at the receiver will restore the necessary filter-to-filter overlap.

The use of digital signal processing facilitates electronic or digital switching of individual filters into groups, as well as dynamic and adaptive adjustment of the number and width of sub-bands, as described above. Furthermore, each of the sub-bands may be independently converted (translated) to arbitrary frequencies for transmission. It is not even necessary that the order of spectral terms be preserved during transmission, since the inverse frequency conversion at the receiver will restore the original spectrum.

In the course of implementing the present invention, practical problems must be addressed. For example, if the basic UWB waveform is 300 MHz wide and the narrowest VHF spectrum slot available is 3 KHz, 100,000 $\sin(x)/x$ filters are required. Considerable simplification can be realized if the basic UWB waveform is a chirp, since the filter responses can be pre-computed digitally. Similarly, the fact that the instantaneous bandwidth of most chirp signals is far less than the total bandwidth may permit 'ignoring' filters that do not 'actively participate' at a given instant in time.

Alternatively, different types of identity transform filters (other than a $\sin(x)/x$ filter) may be more appropriate when the ratio of narrowest-to-broadest available bandwidth is large. Specifically, diplexing type filters may be employed, although they may be more difficult to adjust dynamically. Another alternative filter configuration is to use wavelet transform filter banks to capture the multiple sized spectral bands, and result in a programmable dynamic diplexer. Finally, the filter may be configured so that it does not use extremely narrow bandwidths, since this would result in having to combine a very large number of filters in order to obtain useful radar resolution.

It may also be observed that the RF power amplifiers used to transmit the composite fragmented and translated signal should have high linearity. Even though the original signal may comprise a constant modulus waveform (such as a chirp, as described above), once this basic signal has been fragmented for transmission into the available spectrum slots, it is no longer constant modulus. Consequently, saturating RF power amplifiers could introduce significant intermodulation distortion, that may render the signal unfit for processing. Fortunately, high power RF linear amplifiers are commercially available in the VHF and UHF frequency range. It may also be noted that multiple narrowband amplifiers can be used; it is simply necessary that they be linear.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method for enabling a continuous wideband waveform to be transmitted without mutual interference with other communication signals that occupy portions of a partially occupied spectrum having discontinuous, unoccupied spectral regions, whose total available bandwidth is at least equal to that of the continuous wideband waveform, said method comprising the steps of:

(a) coherently subdividing the frequency continuum of said wideband waveform into a plurality of spectral segments that are capable of fitting into unoccupied spectral regions of said partially occupied spectrum;

(b) frequency translating, as necessary, said plurality of spectral segments to produce frequency-translated spectral segments that respectively fall within said unoccupied spectral regions of said partially occupied spectrum; and (c) combining said frequency-translated spectral segments produced in step (b) for transmission.

2. The method according to claim 1, further including the step of (d) transmitting said frequency-translated spectral segments as combined in step (c).

3. The method according to claim 2, further including the steps of (e) receiving said combined frequency-translated spectral segments transmitted in step (d), and (f) processing the received signals to recover said wideband waveform.

4. The method according to claim 3, wherein processing of said received signals includes correcting for relative motion of a reflector of said transmitted and received signals, in a manner that enables said wideband waveform to be coherently reconstructed.

5. The method according to claim 4, wherein correcting for relative motion includes subjecting said received signals to a Lorentz transformation.

6. The method according to claim 1, wherein step (a) comprises performing identity transform filtering of said wideband waveform by a plurality of spectrally different identity transform filters, so as to coherently subdivide the frequency continuum of said wideband waveform into said plurality of spectral segments capable of fitting into said unoccupied spectral regions of said partially occupied spectrum.

7. The method according to claim 6, wherein a respective identity transform filter comprises a sin(x)/x filter.

8. The method according to claim 1, wherein said wideband waveform comprises a chirp signal having a bandwidth that overlaps and exceeds those of communication systems regulated by the Federal Communications Commission, including broadcast FM and television transmitters, UHF and VHF, and the cellular radio spectrum.

9. A method of transmitting a continuous wideband waveform having a bandwidth that falls within a partially occupied portion of the electromagnetic spectrum, and exceeds that of any unoccupied spectral region of said partially occupied portion of the electromagnetic spectrum, said method comprising the steps of:

(a) identifying unoccupied spectral regions of said partially occupied portion of the electromagnetic spectrum having a total combined bandwidth that is at least equal to that of said continuous wideband waveform;

(b) coherently subdividing the spectral content of said wideband waveform into a plurality of spectral fragments that are capable of fitting into said unoccupied spectral regions of said occupied portion of the electromagnetic spectrum;

(c) frequency translating said plurality of spectral fragments to produce frequency-translated spectral fragments that respectively fall within said unoccupied spectral regions of said partially occupied portion of the electromagnetic spectrum;

(d) combining said frequency-translated spectral fragments produced in step (c) to produce a combined waveform; and (e) transmitting said combined waveform produced in step (d).

10. The method according to claim 9, further including the step of (f) receiving said combined waveform transmitted in step (e), and processing the received combined waveform to recover said wideband waveform.

11. The method according to claim 10, wherein processing of said received combined waveform includes subjecting said received waveform to a Lorentz transformation to correct for relative motion of a reflector of said transmitted and received waveform to enable said wideband waveform to be coherently reconstructed.

12. The method according to claim 9, wherein step (b) comprises performing identity transform filtering of said wideband waveform by a plurality of spectrally different identity transform filters, so as to coherently subdivide the frequency continuum of said wideband waveform into said plurality of spectral fragments capable of fitting into said unoccupied spectral regions of said partially occupied portion of the electromagnetic spectrum.

13. The method according to claim 12, wherein a respective identity transform filter comprises a sin(x)/x filter.

14. The method according to claim 9, wherein said wideband waveform comprises a chirp signal having a bandwidth that overlaps and exceeds those of communication systems regulated by the Federal Communications Commission, including broadcast FM and television transmitters, UHF and VHF, and the cellular radio spectrum.

* * * * *